(12) United States Patent
Atawia

(10) Patent No.: US 12,113,846 B2
(45) Date of Patent: Oct. 8, 2024

(54) DEVICE CAPABILITY-AWARE VIDEO STREAMING IN ADVANCED COMMUNICATION NETWORKS

(71) Applicant: Dell Products L.P., Round Rock, TX (US)

(72) Inventor: Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/066,756

(22) Filed: Dec. 15, 2022

(65) Prior Publication Data

US 2024/0205285 A1    Jun. 20, 2024

(51) Int. Cl.
| | |
|---|---|
| G06F 13/00 | (2006.01) |
| H04L 65/61 | (2022.01) |
| H04L 65/75 | (2022.01) |
| H04L 65/756 | (2022.01) |
| H04L 65/80 | (2022.01) |
| H04L 67/04 | (2022.01) |

(52) U.S. Cl.
CPC ............ *H04L 65/756* (2022.05); *H04L 65/61* (2022.05); *H04L 65/762* (2022.05); *H04L 65/80* (2013.01); *H04L 67/04* (2013.01)

(58) Field of Classification Search
CPC ..... H04L 65/756; H04L 65/61; H04L 65/762; H04L 65/80; H04L 67/04
USPC .......................... 709/224, 217–219, 231–235
See application file for complete search history.

(56) References Cited

U.S. PATENT DOCUMENTS

| | | | |
|---|---|---|---|
| 10,917,700 B2* | 2/2021 | Galecki | .................. H04L 65/80 |
| 2019/0068679 A1* | 2/2019 | Subramaniam Natarajan ............ | |
| | | | H04L 65/612 |
| 2019/0246182 A1* | 8/2019 | Galecki | ................. H04L 65/612 |

FOREIGN PATENT DOCUMENTS

| | | |
|---|---|---|
| CN | 104 735 798 B | 5/2019 |
| EP | 2 413 629 A1 | 2/2012 |

(Continued)

OTHER PUBLICATIONS

Invitation to Pay Additional Fees for PCT Application No. PCT/US2023/035948 mailed Feb. 14, 2024, 14 pages.

(Continued)

*Primary Examiner* — Kenneth R Coulter
(74) *Attorney, Agent, or Firm* — Amin, Turocy & Watson, LLP

(57) ABSTRACT

The technology described herein is directed towards an uplink video streaming technology including for private networks that use low-cost mobile devices with reduced hardware capabilities (RedCap in 3GPP). The technology adapts the video quality (bitrate) from the content producer side based on the device capability data of the content consumer, leveraging that both are co-located in the same network. The technology can use machine learning to identify correlated devices with suboptimal video quality, and to propose new uplink data rate limiting data (e.g., PRB quota) for the content provider, to enforce an updated (e.g., reduced) video quality independent of any streaming application. The technology reduces spectrum loss, energy consumption and video rebuffering that otherwise often occur when videos are generated with high quality beyond the capabilities of the video consumers (e.g., including RedCap devices).

20 Claims, 14 Drawing Sheets

(56) References Cited

FOREIGN PATENT DOCUMENTS

EP   3 522 486     8/2019
WO   2023/023604   2/2023

OTHER PUBLICATIONS

International Search Report and Written Opinion received for PCT Application Serial No. PCT/US2023/035948 dated May 2, 2024, 24 pages.

* cited by examiner

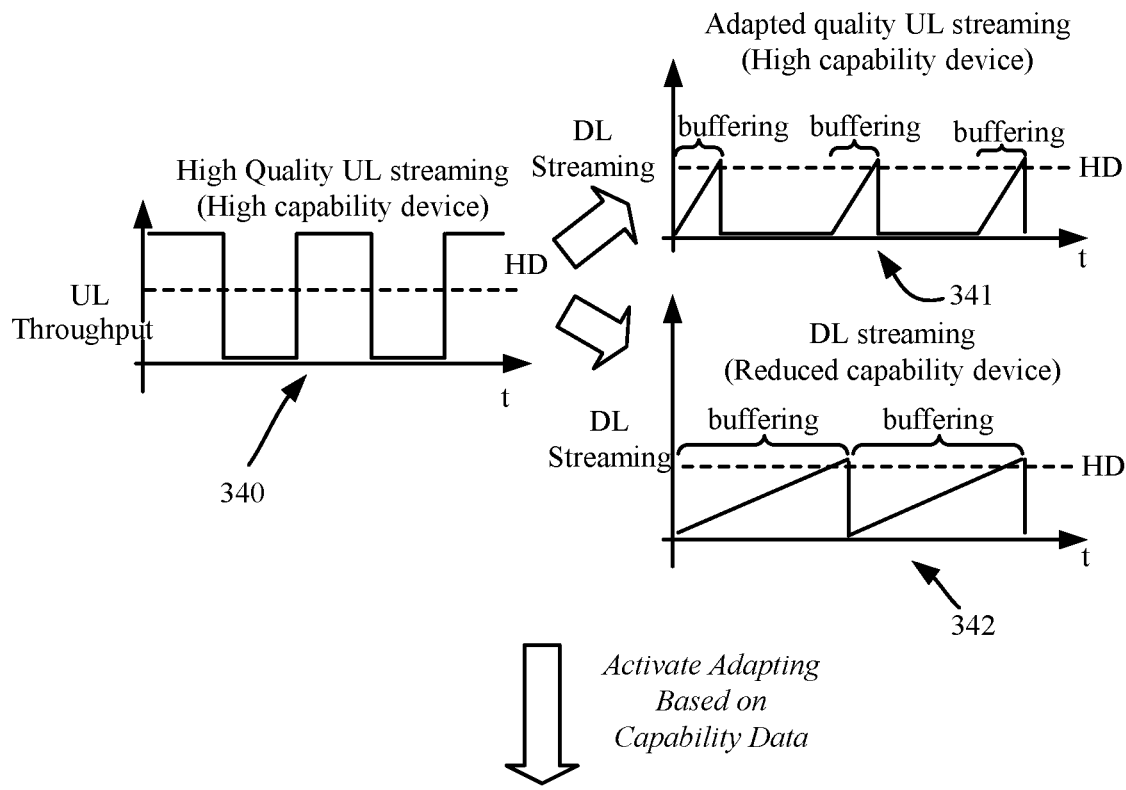
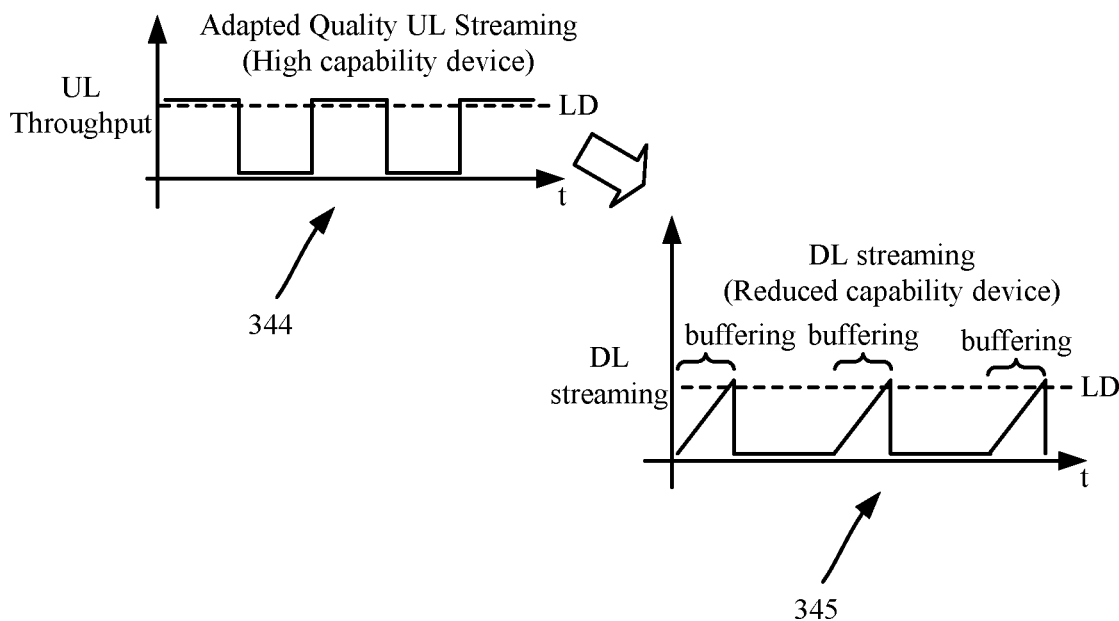
FIG. 3

DEVICE CAPABILITY-AWARE VIDEO STREAMING IN ADVANCED COMMUNICATION NETWORKS

BACKGROUND

Private fifth generation (5G) networks and beyond are adopting uplink (UL) video streaming applications, such as for industry process monitoring and surveillance. The captured content is expected to be downloaded to and viewed on other user devices with different capabilities, which can correspond to different supported data rates. Example user devices can include traditional 5G user equipment (UEs) or user devices with full duplex configuration and large bandwidth, as well as the now-emerging low-cost reduced capability (RedCap) devices that are being standardized in the third generation partnership project (3GPP). These reduced capability devices have low cost and longer battery life and thus can suit wearables such as smart watches, monitoring screens or augmented reality/virtual reality goggles.

Due to the small supported bandwidth and half-duplex configuration, downlink (DL) streaming of high-quality videos on such reduced capability devices consume large air interface resources (e.g., physical resource blocks, or PRBs) to transmit video content. This is associated with a high risk of video stalls and rebuffering, causing violations of quality of experience (QoE) levels. Further, the extended connection time to download the video data decreases the battery lifetime of the user device.

Current ways of uploading videos use the channel conditions and capabilities of the UE that captures and uploads the video, the content producer, to decide on the bitrate (i.e., video quality). The uploaded file at the server can be encoded in different bitrates (corresponding to various qualities), and adaptive video streaming protocols can be used during the transmission. In the download side, the transmission bitrate is decided by the streaming server based on the channel conditions of the streaming UE/content consumer. In the case of reduced capability devices, only low-quality videos are eventually streamed, while the higher-quality versions of the video (the original captured one and the encoded versions) will seldom be used. This wastes uplink (UL) bandwidth and energy of the devices capturing the video, results in excess encoding and storage at the server and edge nodes, and delayed buffering at the streaming device until the streaming server can converge to the best suitable quality for the content consumer device. In addition, encoding in multiple video qualities introduces delay in content availability, which is not acceptable in many video streaming applications used for private 5G monitoring.

BRIEF DESCRIPTION OF THE DRAWINGS

The technology described herein is illustrated by way of example and not limited in the accompanying figures in which like reference numerals indicate similar elements and in which:

FIG. 3 is an example graphical representation showing how modifying uplink throughput over time can shorten buffering durations and no video stalls in reduced capability devices that consume the video, in accordance with various aspects and implementations of the subject disclosure.

DETAILED DESCRIPTION

Figure 1:
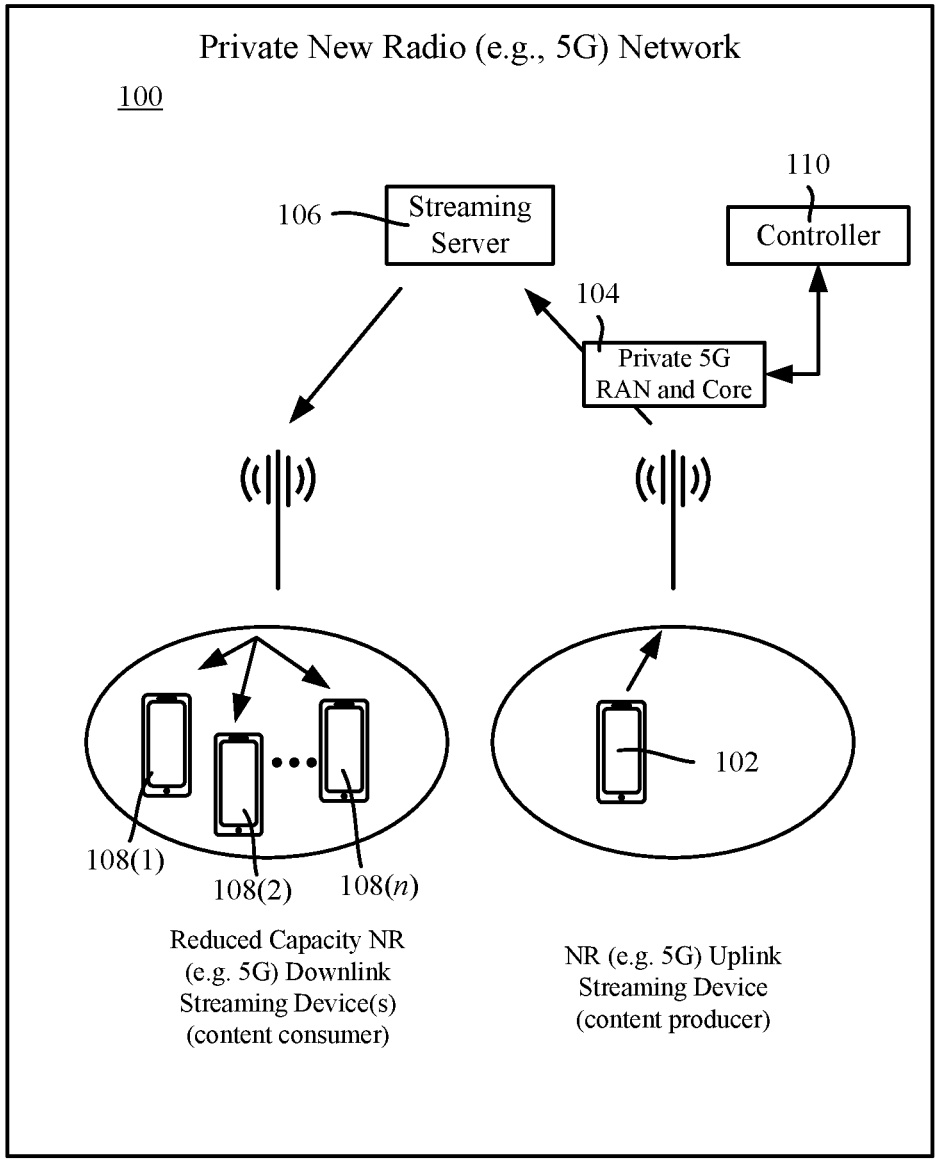
FIG. 1 depicts an example representation of an example uplink streaming device sending data-rate controlled content to reduced capability devices in a private network, in accordance with various aspects and implementations of the subject disclosure.

Various aspects of the technology described herein are generally directed towards recommending the quality (bitrate) of captured videos based on capabilities of the consuming streaming devices. Such video consumer devices can include reduced capability (RedCap) devices expected to consume the video content in private 5G networks. Based on the calculated quality, the technology described herein limits the radio access network (RAN) resources available in the uplink to force such recommended quality without the need to interact with video streaming application, whereby the technology is agnostic to different streaming protocols.

In one implementation, the technology described herein performs various operations to determine recommendations and enforce the recommendations end-to-end, including in a private 5G network. This can include identifying potential streaming user devices and their hardware capabilities; for example, quality-of service (QOS)-aware entities such a 5G core policy control function (PCF) and the RAN centralized unit control plane (CUCP) can identify that the producers and consumers of the same video content are co-located in a common private 5G network. The hardware capabilities of consumer streaming devices and their channel conditions can be used to calculate a maximum data rate available for down link (DL) streaming, as well as identifying low user equipment (UE) QoS levels due to suboptimal video streaming data rates.

Based on the capability data and/or the channel conditions, the technology described herein operates to limit uplink (UL) radio resources for video upload. For example, the estimated downlink data rate of reduced capability devices is used to calculate a corresponding uplink data rate, which can then be the basis for limiting the radio resources available for uplink. This limitation results in the video producer UE and the streaming server lowering the video quality (bitrate), independent of whether the video producer has advanced device radio capabilities and/or excellent RF conditions. The uploaded video thus is communicated at a bitrate that can be streamed to (downloaded by) reduced capability devices without rebuffering. Note that this is unlike existing approaches that rely solely on the video producer channel quality to decide on the video quality, which can result in generation of high-quality videos that do not suit the reduced capability streaming devices and can thus violate quality of experience (QoE) criterion.

It should be understood that any of the examples herein are non-limiting. As one example, the technology is described in an O-RAN-compliant environment, however this is only an example and can be implemented in similar environments, including those not yet implemented. For another, some of the examples herein are based on limiting physical resource block (PRB) quotas to reduce the uplink data rate, however one or more other alternatives, including a number set forth herein, can accomplish such data rate limiting. Thus, any of the embodiments, aspects, concepts, structures, functionalities or examples described herein are non-limiting, and the technology may be used in various ways that provide benefits and advantages in communications and computing in general. It also should be noted that terms used herein, such as "optimization," "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 is an example representation of a private 5G network 100 that has incorporated the technology described herein that limits uplink data rate based on consumer device capability data. In FIG. 1, a content producer streaming device 102 uploads, via a private 5G RAN and core network entities 104, video content to a streaming server 106. The captured content is expected to be downloaded by and viewed or otherwise rendered on one or more other user devices 108(1)-108(n) with different capabilities, and possibly different channel conditions, either or both of which can result in different supported data rates. The consumer user devices 108(1)-108(n) can be reduced capability devices. As described herein, a controller 110 can determine and enforce the uplink data rate based on the capability data of the consumer user devices 108(1)-108(n).

Figure 2:
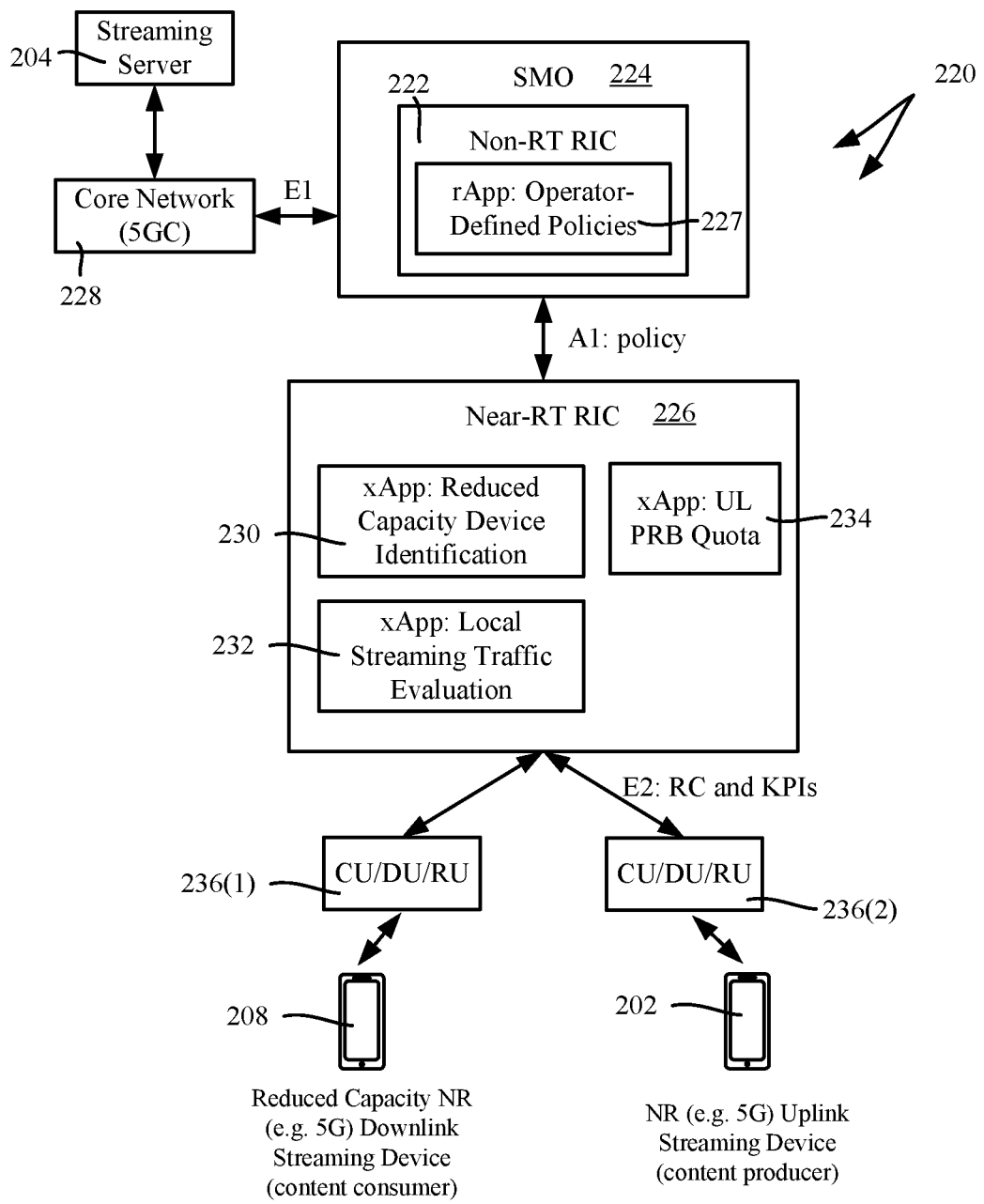
FIG. 2 is a block diagram representation of an example system/architecture of example radio access network (RAN) components by which device capability-aware video streaming can be accomplished, in accordance with various aspects and implementations of the subject disclosure.

FIG. 2 shows an example of one way in which the technology described herein can be implemented in an open radio access network (O-RAN) compliant architecture 220. This can, for example, be accomplished by leveraging an O-RAN non-real-time RAN intelligent controller 222 (non-RT-RIC, incorporated into a service management and orchestration platform, or SMO 224) and O-RAN near-real-time RAN intelligent controller (near-RT RIC) 226 as described herein.

The controller operations can be disaggregated between multiple entities, e.g., by having the SMO 224 hosting the non-real-time RIC 222, which hosts an rApp 227 with operator-defined policies such as thresholds for identifying a reduced capability device and identifying local streaming private 5G devices. The SMO 224/non-real-time RIC 222 can also use information obtained over the EI interface from the 5G core network, 228 such as 5QI configuration and traffic load.

In one implementation, the rApp 227 provides these policies over the A1 interface to the near-RT RIC 226. One implementation adopts operator-defined 5G QoS identifier (5QI) policies and machine learning to identify co-located devices connected to the same private 5G network producing or consuming the video content, including where the consumer is a reduced capability device according to operator-defined policy data. Supervised and reinforcement learning as described herein can be used to detect suboptimal streaming quality, and for example, adapt the UL PRB quota based on the capabilities of the devices and a target QoE level.

As depicted in FIG. 2, the near-real-time RIC 226 hosts three xApps related to the technology described herein. A reduced capability device identification xApp 230 reads RRC messages over the E2 interface for checking UE capability data and identifying reduced capability devices using policy defined thresholds. A local streaming traffic evaluation xApp 232 reads QoS key performance indicators (KPIs) and downlink and uplink traffic loads obtained over the E2 interface, to evaluate the bitrate of streamed applications with respect to policy-defined thresholds. A UL PRB quota xApp 234 provides actions and policies over the E2 interface to the centralized unit(s), distributed unit(s) and/or radio unit(s) (CU/DU/RU, blocks 236(1) and 236(2) to limit the data rate, e.g., via the UL PRBs granted as available for a content producer UE 202 to upload data for consumption by a reduced capability device 208.

FIG. 3 shows graphical representations of streaming content to contrast high quality uplink streaming 340, including uplink video streaming with high quality (HD) due to advanced device capability of the content producer, prior to activating adapting the uplink data rate based on device consumer capability data, and after activating adapting the uplink data rate based on device consumer capability data. The graphical representation 341 shows a smooth, short buffering duration video streaming downlink by a content consumer that has advanced device capabilities (e.g., similar to the content producer device). In contrast, the graphical representation 342 shows a large buffering duration of a reduced capability content consumer device (e.g., small bandwidth) resulting in video stalls, as well as requiring large air interface resources.

The technology described herein is shown in the uplink graphical representation 344 and the downlink graphical representation 345. As can be seen, upon identification of a reduced capability device otherwise experiencing large buffering (resulting in video stalls) as in the representation 342, the controller (not explicitly shown in FIG. 3) has adapted the video quality to a lower value (LD) at the source (UL streaming content producer, graph 344) within the same private 5G network, resulting in a shorter buffering duration and therefore no video stalls (graph 345).

Figure 4:
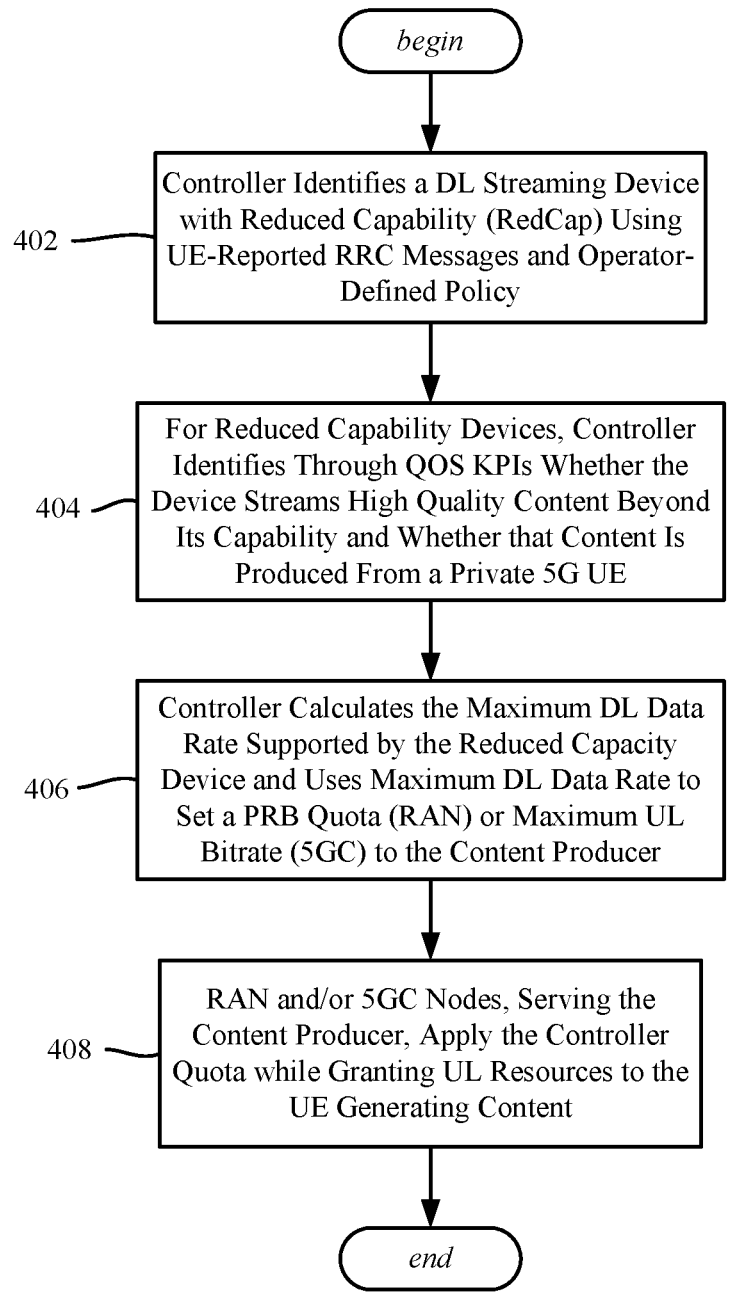
FIG. 4 is an example flow diagram representing a general overview of operations that can be taken to achieve device capability-aware streaming, in accordance with various aspects and implementations of the subject disclosure.

FIG. 4 shows an overview of example operations performed by a controller, e.g., a near-RT-RIC, to achieve device capability-aware streaming in a private 5G network. Note that the operator has defined one or more criteria for considering a UE as reduced capability device, e.g., based on a maximum modulation coding scheme, the number of multiple-input multiple-output (MIMO) layers and maximum supported bandwidth), and the like.

That is, reduced capability device capability data corresponds to the MIMO layers, maximum bandwidth and maximum modulation schemes, which are available through radio resource control (RRC) messages (e.g., UECapabilityInformation and the enclosed featureGroupIndicators as defined in 3GPP), and sent by a UE as a response to a ueCapability Enquiry RRC message sent by the serving cell.

Thus, operation 402 represents the controller identifying a downlink streaming device with reduced capability using the UE reported radio resource control messages with such information with respect to the operator-defined policy data. A downlink streaming service can be defined through the amount of traffic measured at a specific QoS flow (referred to as 5QI in 5G). This includes the traffic arrival rate (e.g., packets/second corresponding to a video frame) and the time difference between downlink and uplink traffic arrival (the uplink will carry an application-related ACK).

At operation 404, for a reduced capability device the controller identifies through QoS KPIs whether the device streams high-quality content beyond its capability and whether that content is produced from a private network 5G UE. In this example, consider that these conditions are met.

For example, in one implementation, QoS KPIs such as packet reordering, packet delay and UE throughput can indicate a UE streaming content beyond its capability, thus resulting in adapting the data rate from the content producer as described herein. As also described herein, the content producer can be identified based on time-correlation between a UE's generated uplink traffic and the traffic of downlink streaming bearers within the private 5G network; note that this is beside the operator input as defined herein.

At operation 406, the controller calculates a maximum downlink data rate supported by the reduced capability device, and in one embodiment uses the downlink data rate to set a PRB quota (RAN) or maximum uplink bitrate (5G Core, 228 FIG. 2) for the content producer. Note that other options for controlling/limiting the data rate at the video producer side include, but are not limited to, limiting the maximum number of UL MIMO layers, limiting UL component carrier (CC) in carrier aggregation devices, limiting the discontinuous reception (DRX) ON duration to a short duration, limiting the number of transmission time intervals for scheduling, and/or limiting the maximum modulation coding scheme (MCS).

At operation 408, the RAN and/or 5GC nodes, serving the content producer, apply the controller quota or the like with respect granting UL resources to the UE that is uploading (generating/producing) the content. In general, this limited data rate/controlled quota can correspond to the graphical representations 344 and 345 in FIG. 3.

Figure 5:
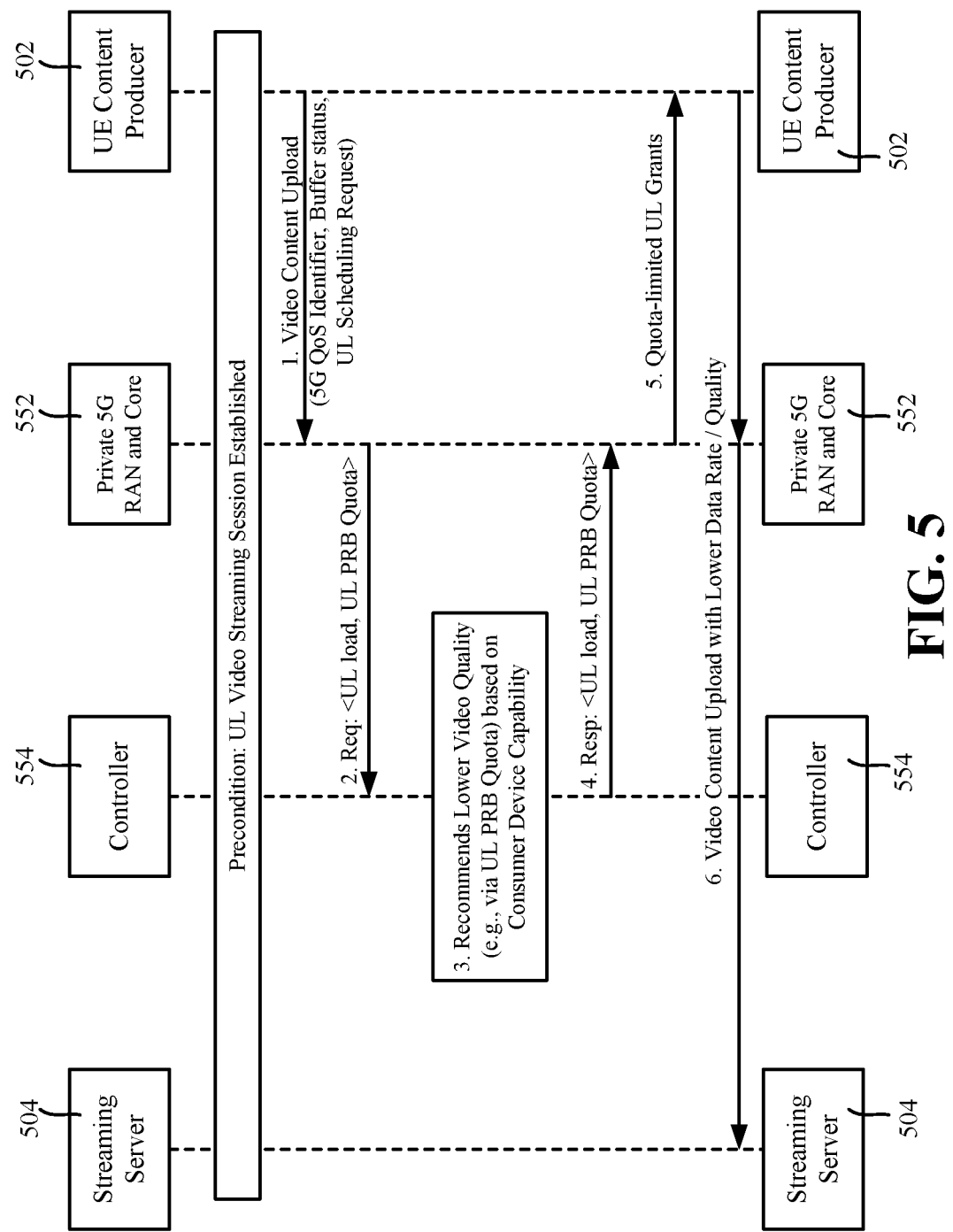
FIG. 5 is an example component and signaling diagram showing example dataflow sequences related to limiting the uplink data rate of a content producer, in accordance with various aspects and implementations of the subject disclosure.

FIG. 5 shows the flow of data communications among example components for limiting the content producer data rate, after an UL video streaming session has been established with a content producer 502. In this example, the content producer 502 is coupled via the private 5G RAN and core (block 552) to a controller 554 as described herein. As also shown in the example of FIG. 5, a streaming server 504 obtains the uplink data from the content producer 502 via the private 5G RAN and core (block 552).

As represented by the arrow labeled one (1), the content producer 502 requests video content upload to the RAN and core (block 552) based on a 5G QoS identifier, buffer status, and UL scheduling request data. In turn, the RAN and core (block 552) sends a corresponding request "<UL load, UL PRB quota>" to the controller 554, as represented by the arrow labeled two (2).

As represented by block three (3), the controller 554 recommends lower video quality (e.g., via UL PRB quota data) based on the consumer device's capability data as described herein, and responds to the request with a response comprising the data for the "<UL load, UL PRB quota>request as represented by the arrow labeled four (4).

Quota-limited uplink grants, represented by arrow five (5), are applied to the content producer 502 in this example. This results in video content upload with lower data rate/ quality as represented by the arrow labeled six (6).

Figure 6:
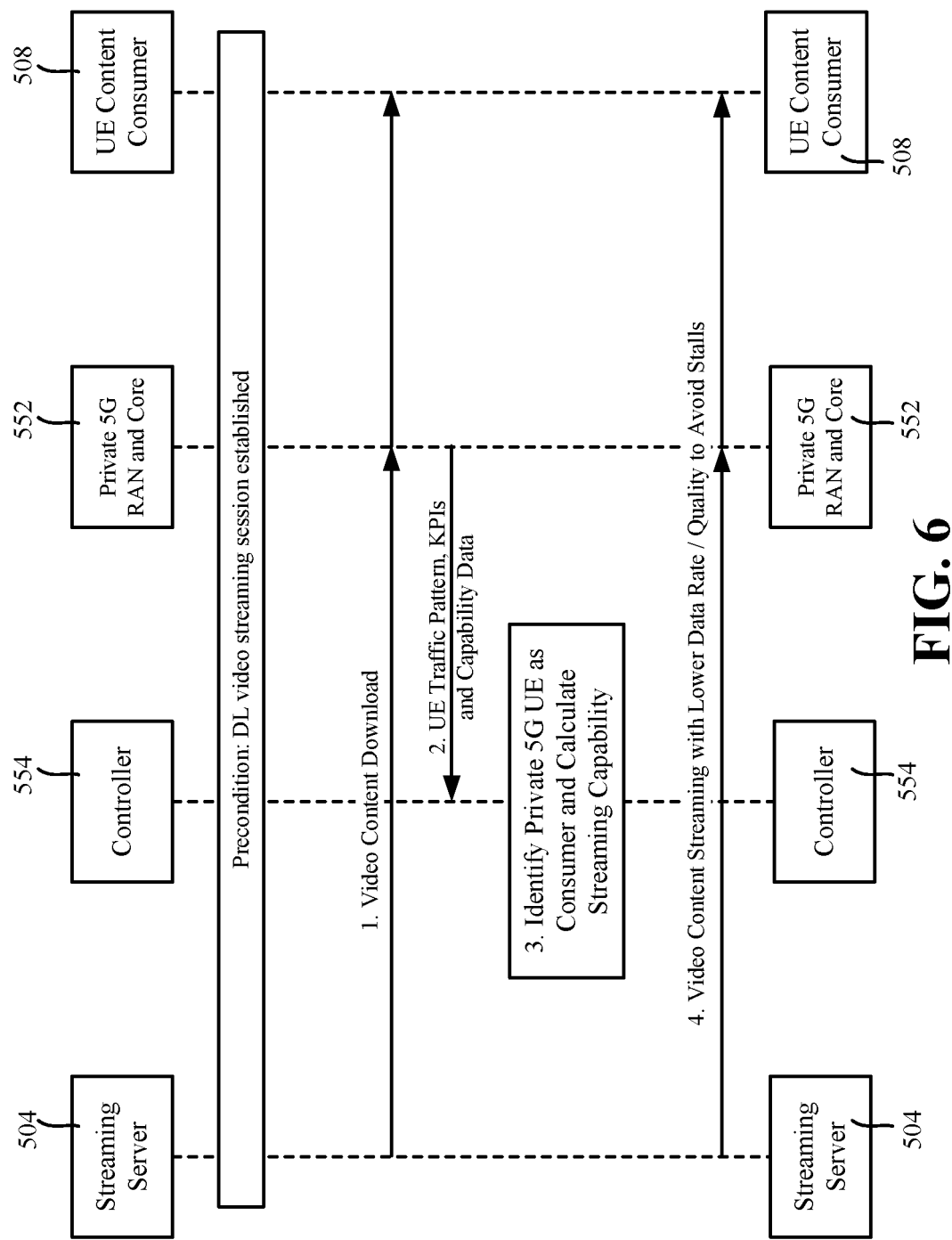
FIG. 6 is an example component and signaling diagram showing example dataflow sequences related to identifying and adapting the uplink data rate of a content producer device uploading data for download to a content consumer device, in accordance with various aspects and implementations of the subject disclosure.

FIG. 6 shows an example flow of data communications among components related to identifying and adapting to the capability data of a private network content consumer 508, once a downlink video streaming session is established. The arrow labeled one (1) represents the video content download from the streaming server 504 to the content consumer 508 via the RAN and core (block 552). The RAN and core (block 552) sends the UE traffic pattern, KPIs and capability data to the controller 508, as represented by the arrow labeled two (2).

As represented by block three (3), the controller identifies the content consumer 508 as a private 5G UE, and calculates the streaming capability for the consumer UE 508. Based on this information, (via the communication flow of FIG. 5), video content is streamed to the consumer UE 508 with lower data rate/quality to avoid stalls, as represented by the arrow labeled four (4).

Figure 7:
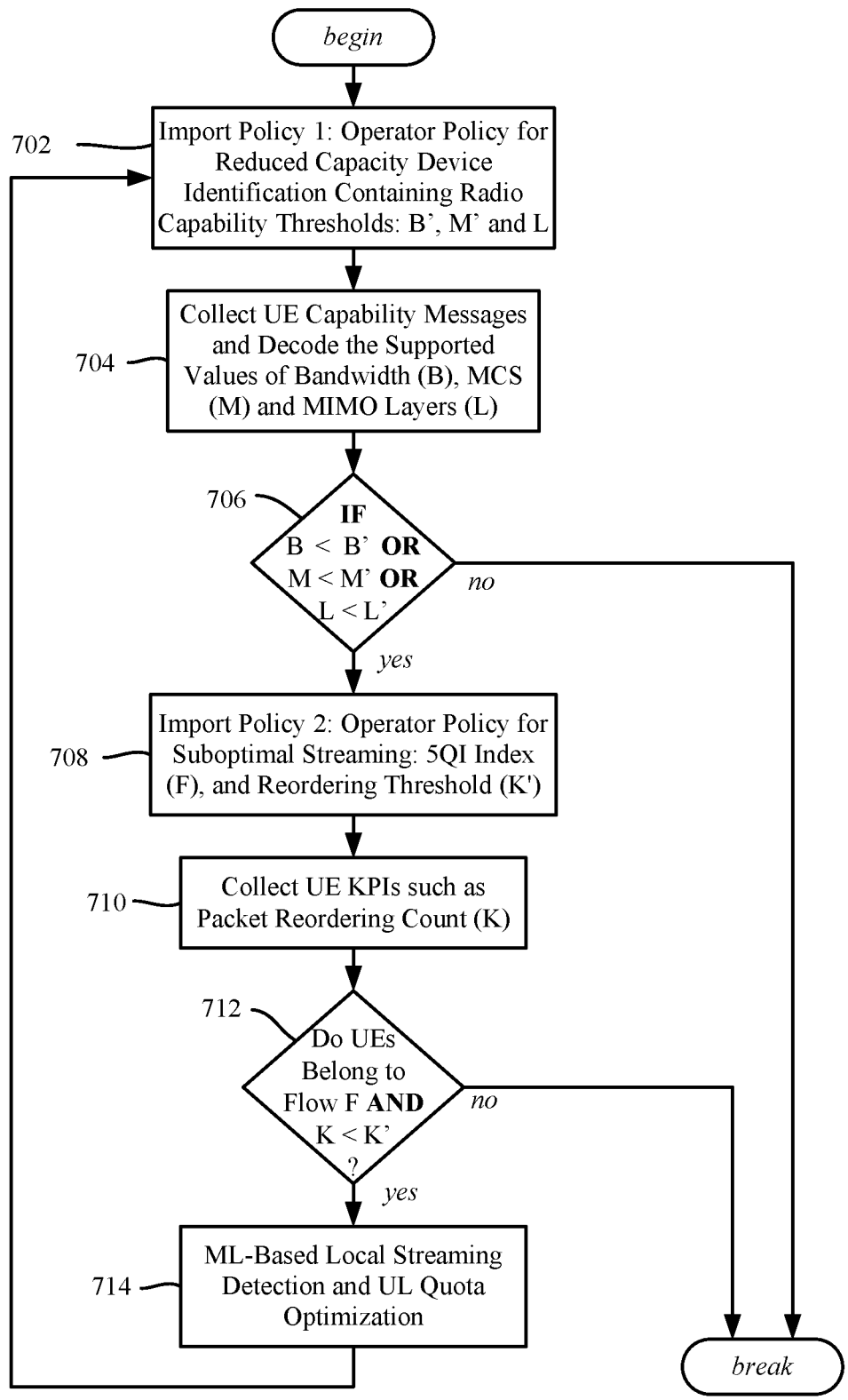
FIG. 7 is a flow diagram showing example operations related to applying policy data to trigger uplink data rate optimization, in accordance with various aspects and implementations of the subject disclosure.

FIG. 7 is a flow diagram directed towards various example aspects described herein. At operation 702, first operator-defined policy data is sent to the controller that can be used to identify a reduced capability device. For example, the operator can define thresholds for the UE capability, such as supported bandwidth (B'), modulation and coding scheme (M'), and number of MIMO layers (L') as described with reference to FIG. 2.

Operation 704 obtains the actual device values from the consumer device, e.g., as also described with reference to FIG. 2. If at operation 706 the controller detects that corresponding values reported in the UE capability message are below any of these thresholds, the consumer device is flagged as a reduced capability device, and the process continues to operation 708.

Operation 708 imports second operator-defined policy data that identifies local streaming with suboptimal video quality (bitrate). The second policy data can define both the QoS flow (F) for UEs attached to monitoring devices (both content producers and consumers), and the maximum allowed packet reordering count (denoted by K') for the devices on the selected flow. This packet reordering count metric can be used to indicate video rebuffering due to suboptimal quality from the producer.

Operation 710 collects the consumer device reordering count data K for the flow F. Operation 712 determines whether the UE (e.g., for each consumer UE) with traffic load belonging to flow F, and also that the measured packet reordering count (K) is below the policy threshold K'. If so, the controller uses machine learning (operation 714, with additional detail represented in FIGS. 8A AND 8B) to detect if the content producer is within the same private 5G deployment, that is, to identify local content producers and adapt the UL PRB quota (FIGS. 9A and 9B).

Figure 8A:
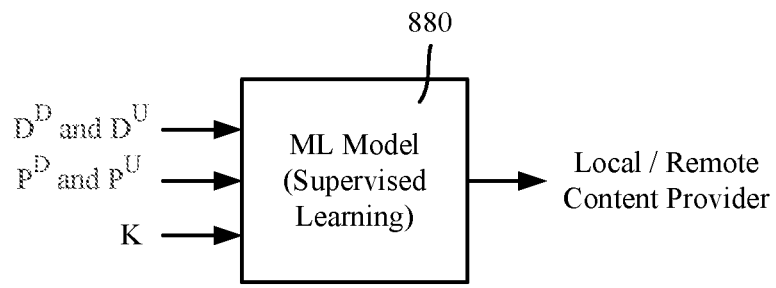
FIGS. 8A and 8B show example concepts related to machine learning-based detection and data rate adaptation, in accordance with various aspects and implementations of the subject disclosure.
Figure 8B:
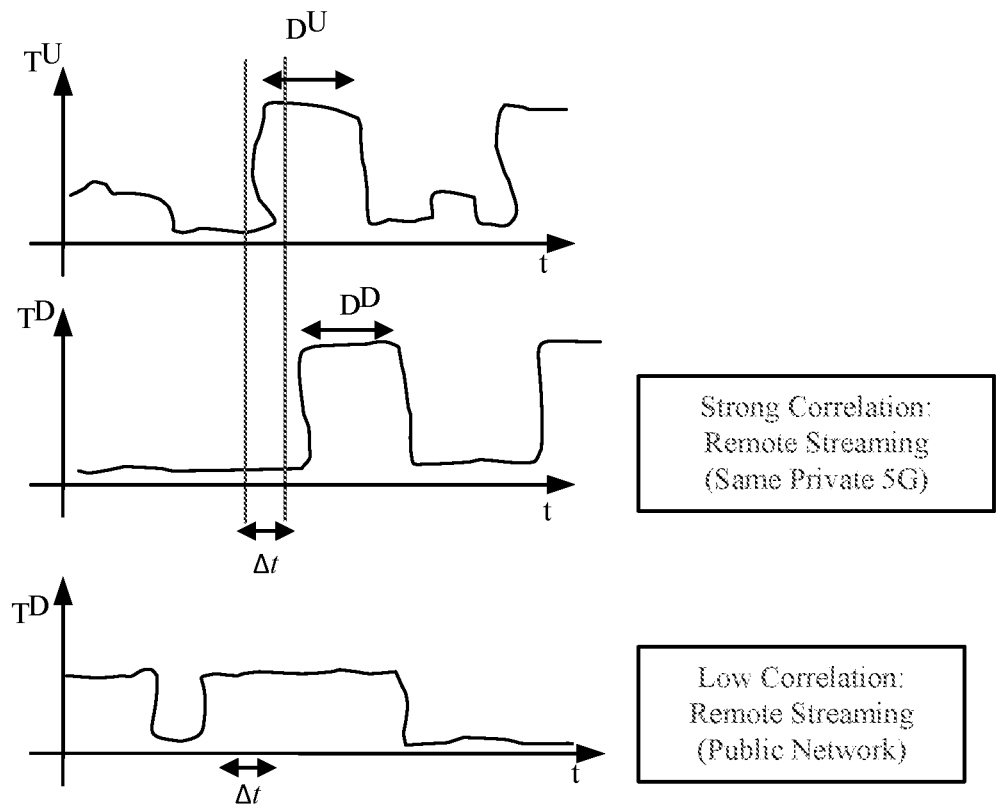

FIG. 8A shows a supervised learning model 880 with a number of inputs as described herein along the measured packet reordering count K to determine whether the content provider device is local or remote with respect to the content consumer device. As shown in FIGS. 8A and 8B, the machine learning based detection and quota adaptation can be based on burst identification, in which the total number of bytes in the uplink ($T^U$) and the downlink ($T^D$) are evaluated in order to identify video sessions with significant events (e.g., a person is detected), which usually result in a traffic burst with durations DU and DD, respectively With respect to traffic correlation, the time difference (Δt) between the burst occasions in both uplink and downlink is calculated; a small positive value indicates a positive correlation between both devices, and thus the traffic is identified as local streaming. Other time-series correlations such as Pearson coefficient can be used to where a value close to one (1) will indicate a strong correlation and thus can be deemed as local streaming.

Via supervised learning 880, the above traffic profile KPIs are combined with the reordering count (K) and the PRB utilization in DL ($P^D$) and UL ($P^U$) to further refine the identification of local streaming with suboptimal data rate (video quality). In general, a large PRB utilization value indicates that the reordering is due to large data rate that cannot be served by the reduced capability device.

Figure 9A:
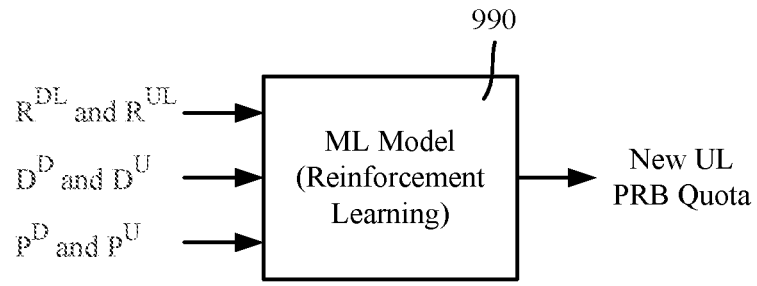
FIGS. 9A and 9B show example concepts related to machine learning-based data rate adaptation (via modification of uplink resource quota information at the producer device to reach a more optimal quality for downloading and rendering data at the consumer side, in accordance with various aspects and implementations of the subject disclosure.
Figure 9B:
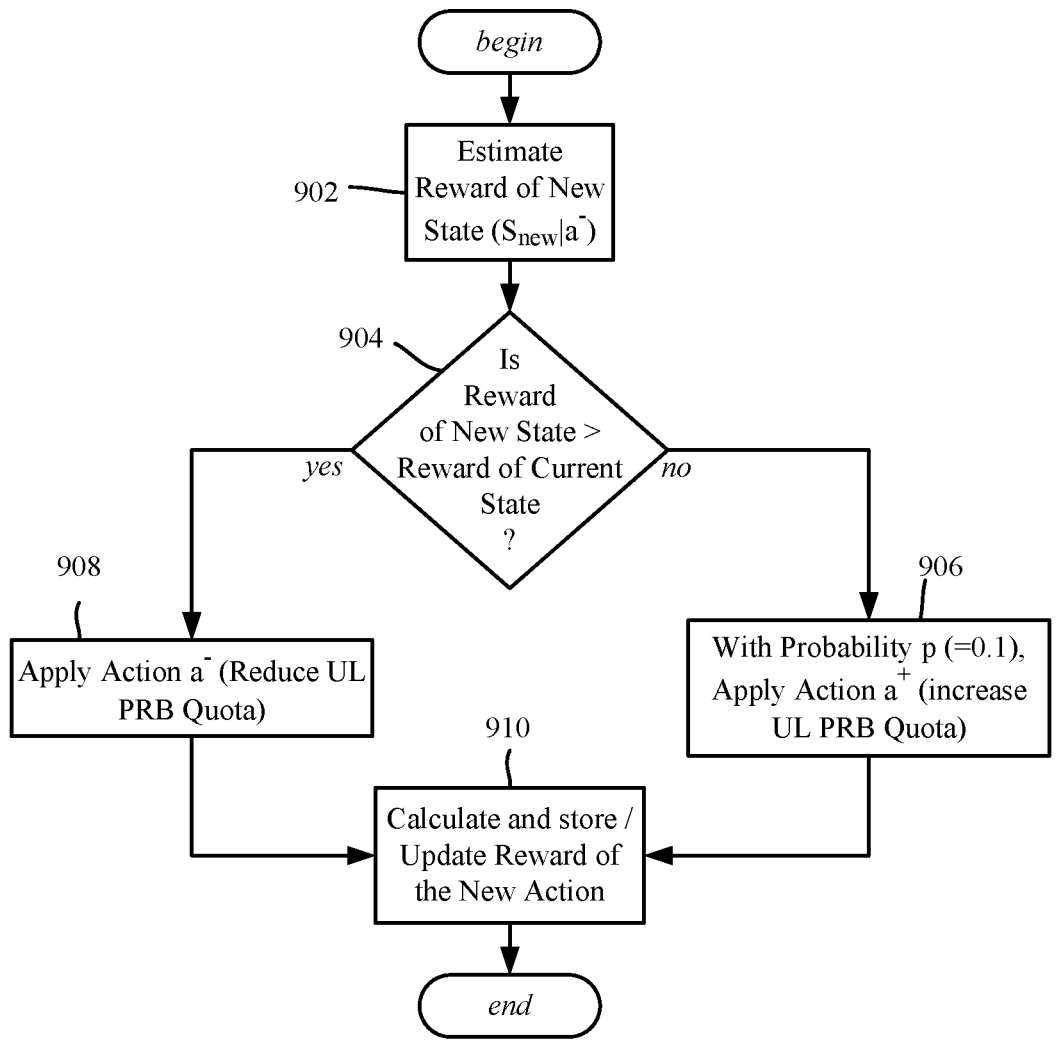

FIGS. 9A and 9B are directed towards adapting the UL PRB quota (at the producer UE) to reach the highest (e.g., optimal) quality that does not violate the QoS requirements on the consumer side. Reinforcement learning 990 (RL, with weights w1, s2 and w3) can be used as a machine learning model with the following configuration, estimated at block 902:

$$\text{Reward} = w1 * \max(0, K' - K) + w2 * R^{DL} + w3 * R^{UL}$$

Reward is calculated as a function of the reordering count to reflect rebuffering at the consumer side. The first term shows a positive reward when the reordering (K) is less than the threshold (K'), and 0 otherwise. The second and third terms correspond to the DL throughput ($R^{DL}$) and UL throughput ($R^{UL}$), which represent the video quality. Thus, if there are two video qualities that result in the same reordering value (rebuffering), the model selects the one with higher quality.

State=$f(R^{DL}, R^{UL})$=$w1*P^D+w2*P^U$ represents the state as a function of DL PRB utilization (PD) and UL PRB utilization (PU), which depend on the selected UL PRB Quota (RL action) evaluated via operation 904:

$$\text{Action} = \{a^+, a^-\}$$

where $a^+$ increases UL PRB quota (operation 906), while $a^-$ decreases UL PRB quota (operation 908), as used via operation 910. The amount of the increase/decrease step (which can be different) is configured by the operator and provided over the A1 or O1 interfaces.

Figure 10:
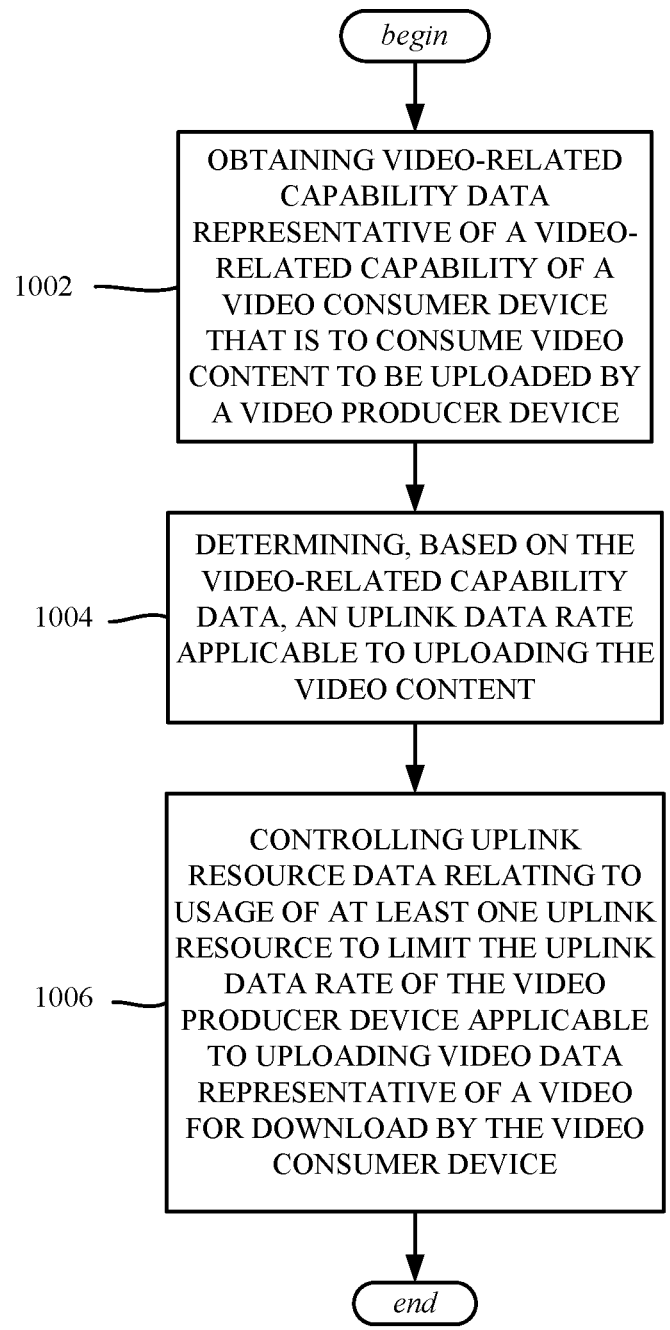
FIG. 10 is a flow diagram showing example operations related to controlling uplink resource data to limit the uplink data rate of a video producer device based on capability data of a video consumer device, in accordance with various aspects and implementations of the subject disclosure.

One or more aspects can be embodied in a network device, such as represented in the example operations of FIG. 10, and for example can include a memory that stores computer executable components and/or operations, and a processor that executes computer executable components and/or operations stored in the memory. Example operations can include operation 1002, which represents obtaining video-related capability data representative of a video-related capability of a video consumer device that is to consume video content to be uploaded by a video producer device. Example operation 1004 represents determining, based on the video-related capability data, an uplink data rate applicable to uploading the video content. Example operation 1004 represents controlling uplink resource data relating to usage of at least one uplink resource to limit the uplink data rate of the video producer device applicable to uploading video data representative of a video for download by the video consumer device.

Further operations can include determining that the video consumer device and the video producer device are co-located on a common private network.

Controlling the uplink resource data to limit the uplink data rate can include at least one of: setting uplink physical resource block quota data representative of an uplink physical resource block quota applicable to the uploading of the video data, or setting bitrate data representative of a lower limit on a bitrate used for the uploading of the video data.

Controlling the uplink resource data to limit the uplink data rate can include at least one of: setting uplink multiple-input multiple-output layer data representative of an uplink multiple-input multiple-output layer to use for the uploading of the video data, setting uplink component carrier data representative of an uplink component carrier to use for the uploading of the video data; setting discontinuous reception on duration data representative of a discontinuous reception on duration applicable to the uploading of the video data, setting transmission time interval data for scheduling applicable to the uploading of the video data, or setting modulation and coding scheme data representative of a modulation and coding scheme to use for the uploading of the video data.

Further operations can include determining that video consumer device is a reduced capability device based on defined threshold data comprising at least one of: supported bandwidth data representative of a supported bandwidth of the video consumer device, modulation and coding scheme data representative of a modulation and coding scheme used by the video consumer device, or multiple-input multiple-output layer data representative of a multiple-input multiple-output layer used for communication by the video consumer device.

Obtaining the video-related capability data can include obtaining at least one of: hardware capability data representative of a hardware capability of the video consumer device, or channel condition data representative of a channel condition of a channel via which the video consumer device communicates.

Obtaining the video-related capability data can include obtaining measured packet reordering data representative of measured packet reordering applied by the video consumer device, and further operations can include, based on quality of service index data representative of a quality of service index, that the video producer device and the video consumer device are associated with a common flow, determining that the measured packet reordering data does not satisfy defined reordering threshold data representative of a defined reordering threshold, and in response to the determining that a measured packet reordering count does not satisfy the defined reordering threshold data, detecting, via machine learning, that the video producer device is co-located on a common private network with the video consumer device. Machine learning can modify the uplink data rate, and the machine can be is based on at least one of: a correlation of burst identification traffic, or supervised learning.

Further operations can include adapting the uplink data rate based on reinforcement learning.

The network device can include a controller incorporated at least in part into a near-real time radio access intelligent controller.

Figure 11:
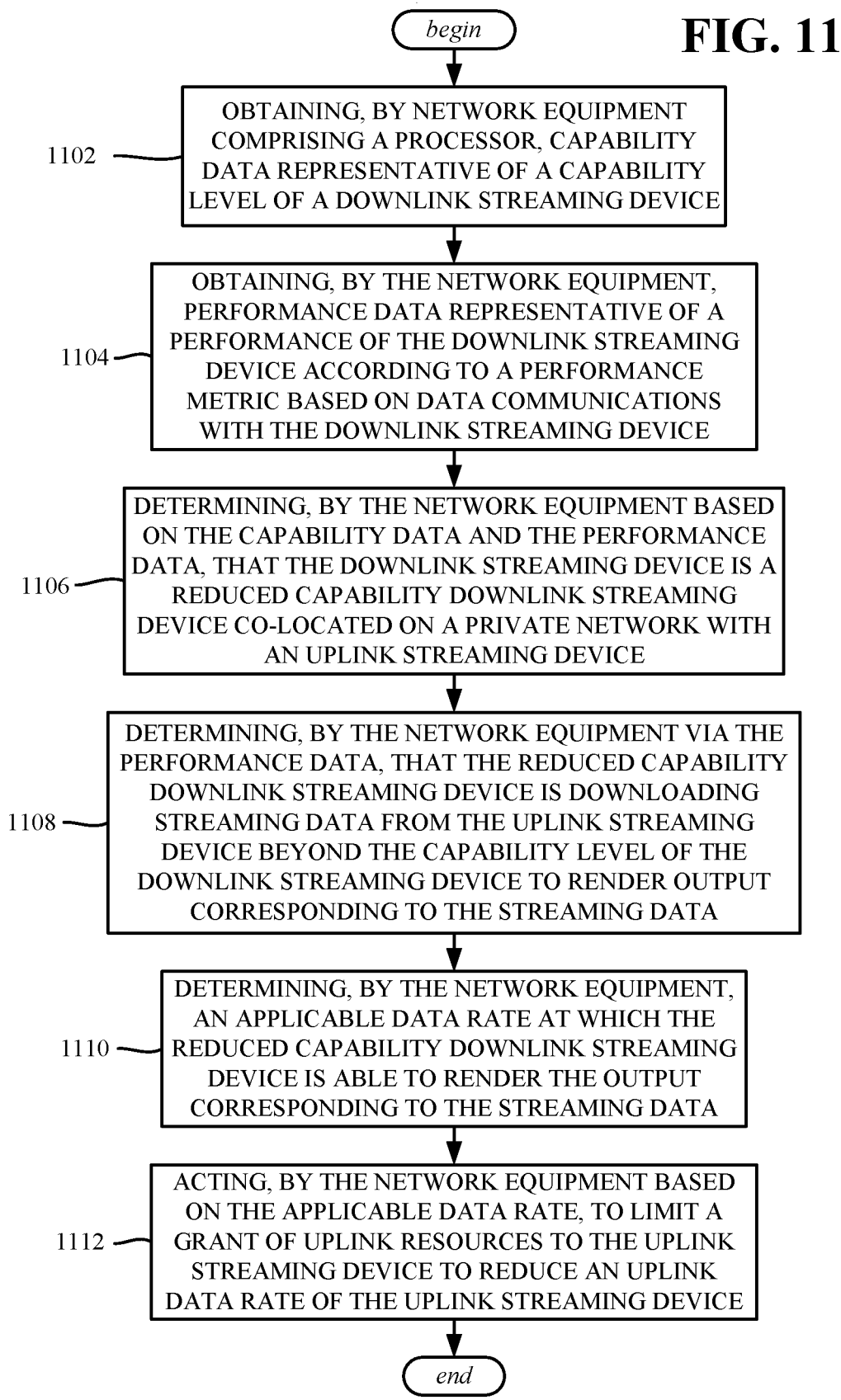
FIG. 11 is a flow diagram showing example operations related to network equipment acting to limit a grant of uplink resources to an uplink streaming device to reduce an uplink data rate, in accordance with various aspects and implementations of the subject disclosure.

One or more example aspects, such as corresponding to example operations of a method, are represented in FIG. 11. Example operation 1102 represents obtaining, by network equipment comprising a processor, capability data representative of a capability level of a downlink streaming device. Example operation 1104 represents obtaining, by the network equipment, performance data representative of a performance of the downlink streaming device according to a performance metric based on data communications with the downlink streaming device. Example operation 1106 represents determining, by the network equipment based on the capability data and the performance data, that the downlink streaming device is a reduced capability downlink streaming device co-located on a private network with an uplink streaming device. Example operation 1108 represents determining, by the network equipment via the performance data, that the reduced capability downlink streaming device is downloading streaming data from the uplink streaming device beyond the capability level of the downlink streaming device to render output corresponding to the streaming data. Example operation 1110 represents determining, by the network equipment, an applicable data rate at which the reduced capability downlink streaming device is able to render the output corresponding to the streaming data. Example operation 1112 represents acting, by the network equipment based on the applicable data rate, to limit a grant of uplink resources to the uplink streaming device to reduce an uplink data rate of the uplink streaming device.

Further operations can include identifying, by the network equipment based on at least one of a result of a machine learning process or an artificial intelligence process, that the downlink streaming device is co-located on the private network with the uplink streaming device.

Further operations can include identifying, by the network equipment, that the downlink streaming device is co-located on the private network with the uplink streaming device based on time-correlation between uplink traffic generated by the uplink streaming device and downlink traffic of at least one streaming bearer within the private network.

Further operations can include obtaining, by the network equipment, first operator-defined policy data, representative of a first policy defined by a network operator and corresponding to device capability threshold data, obtaining, by the network equipment, second operator-defined policy data, representative of a second policy defined by the network operator and corresponding to quality threshold data; the determining that the downlink streaming device is the reduced capability downlink streaming device can include evaluating the capability data of the downlink streaming device with respect to the first operator-defined policy data, wherein the determining that the reduced capability downlink streaming device is downloading the streaming data from the uplink streaming device beyond the capability level of the downlink streaming device can include evaluating the performance data with respect to the second operator-defined policy data.

Further operations can include determining, by the network equipment, a quota corresponding to the applicable data rate; acting to limit the grant of uplink resources can include communicating quota data representative of the quota to a network node that grants the uplink resources to the uplink streaming device.

Further operations can include modifying, by the network equipment, the quota information based on at least one of: a result of a machine learning process or an artificial intelligence process.

Figure 12:
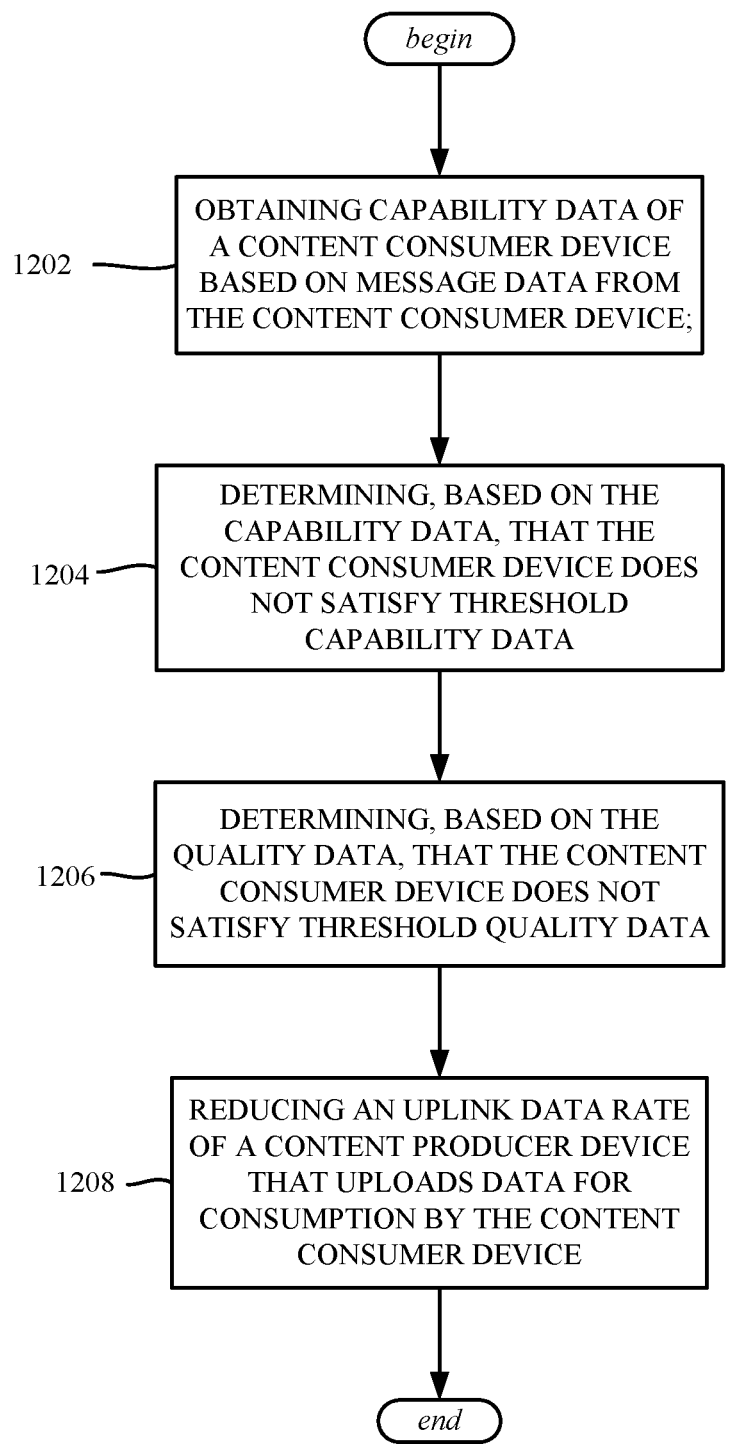
FIG. 12 is a flow diagram showing example operations related to reducing an uplink data rate of a content producer device that uploads data for consumption by the content consumer device based on capability data of a content consumer device, in accordance with various aspects and implementations of the subject disclosure.

FIG. 12 summarizes various example operations, e.g., corresponding to a machine-readable medium, comprising executable instructions that, when executed by a processor of network equipment, facilitate performance of operations. Example operation 1202 represents obtaining capability data of a content consumer device based on message data from the content consumer device. Example operation 1204 represents determining, based on the capability data, that the content consumer device does not satisfy threshold capability data. Example operation 1206 represents determining, based on the quality data, that the content consumer device does not satisfy threshold quality data. Example operation 1208 represents reducing an uplink data rate of a content producer device that uploads data for consumption by the content consumer device.

Reducing the uplink data rate can include at least one of: setting quota data via a radio access network to which the content producer device is coupled, or setting a maximum uplink bitrate via a core network to which the content producer device is coupled.

Further operations can include adapting the uplink data rate based on measured data comprising at least one of: uplink reordering data, downlink reordering data, uplink throughput data, downlink throughput data, uplink utilization data, or downlink utilization data.

Adapting the uplink data rate can include inputting the measured data into a machine learning model.

As can be seen, the technology described herein facilitates improved video streaming reception and processing (e.g., less video stalls) to provide a suitable quality of experience, including in private new radio (5G and beyond) monitoring applications. The technology described herein increases network spectral efficiency by avoiding high-quality videos that require excessive air interface resources to compensate for the reduced capability of some UEs. Through machine learning models, the technology described herein automates data rate reduction, e.g., via UL PRB quota selection, to reduce the operational cost needed for network configuration.

Figure 13:
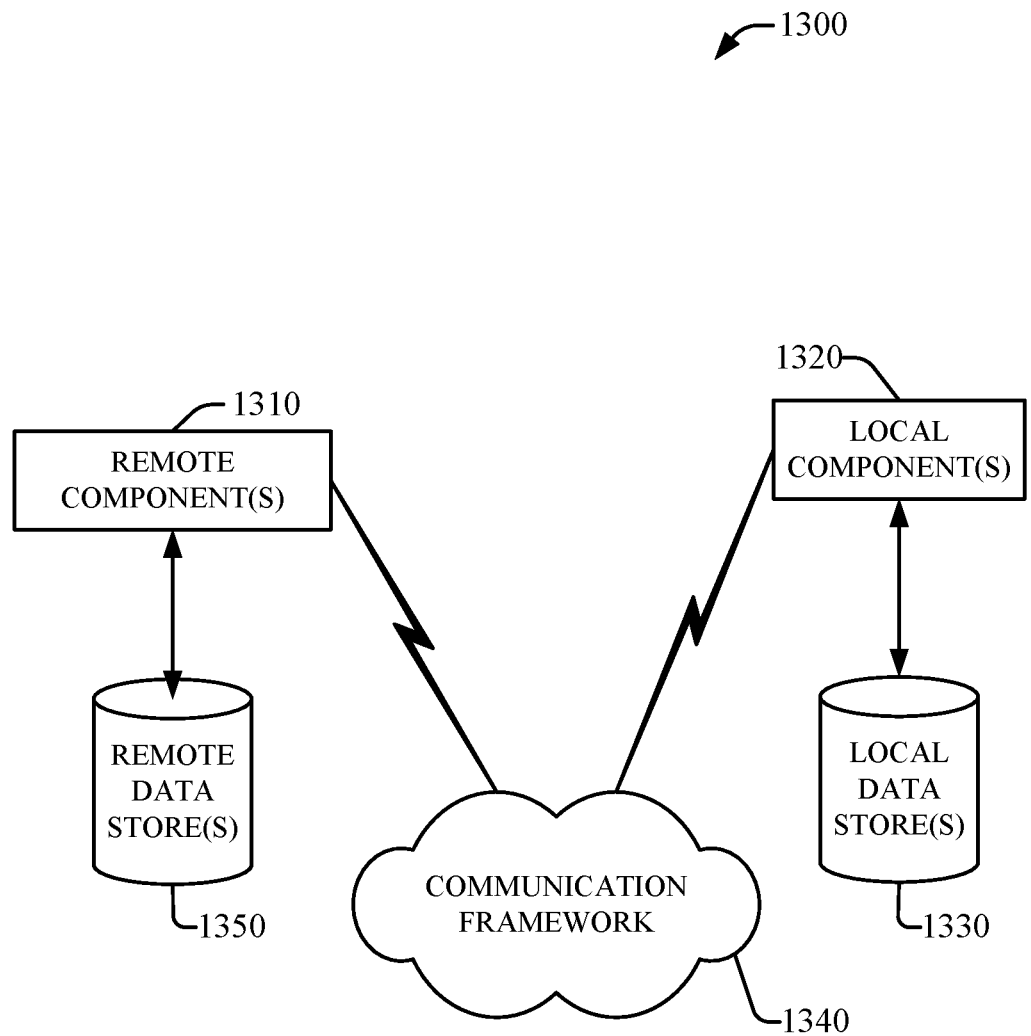
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
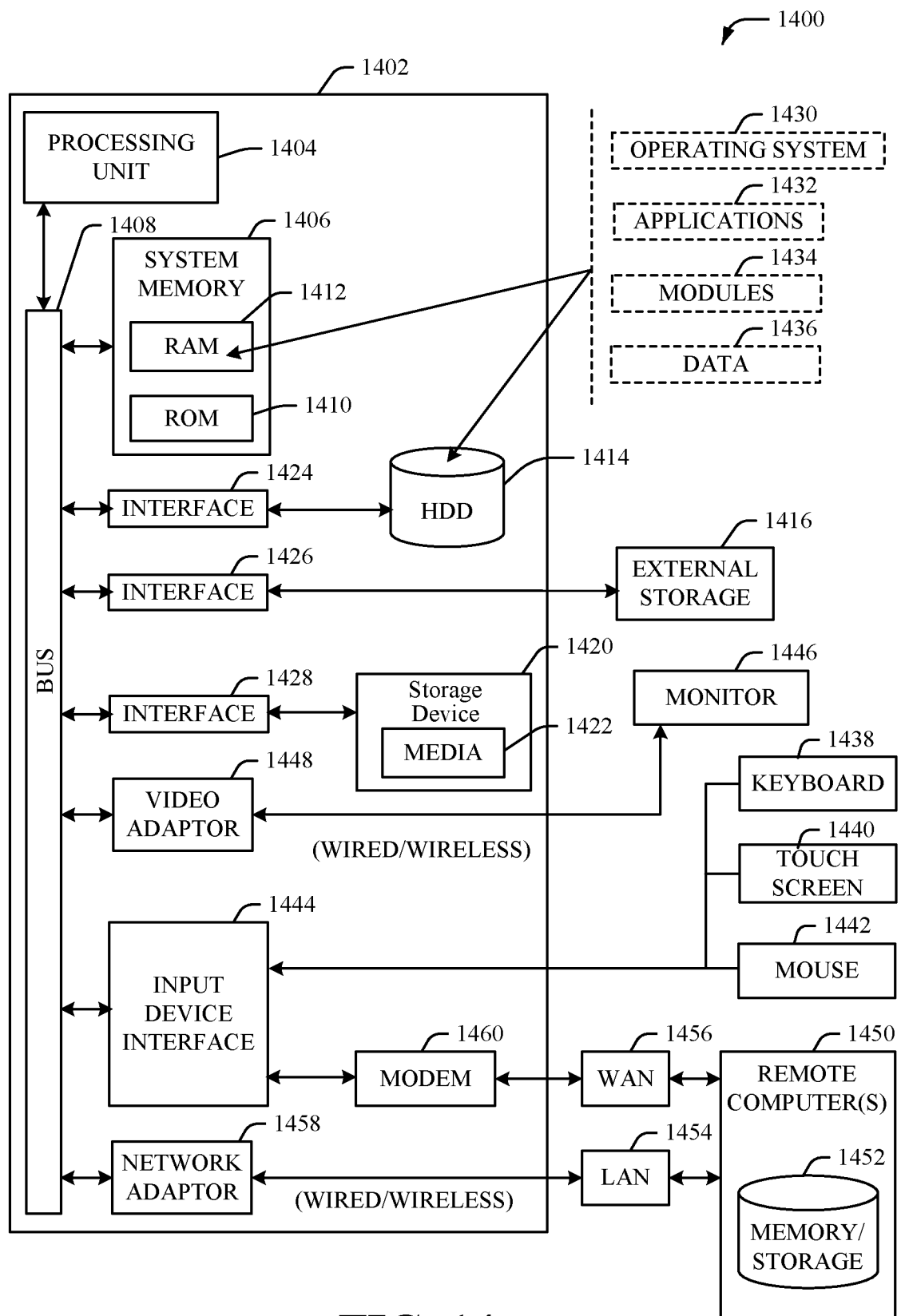
FIG. 14 depicts an example schematic block diagram of a computing environment with which the disclosed subject matter can interact/be implemented at least in part, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A network device, comprising:
   a processor; and
   a memory that stores executable instructions that, when executed by the processor, facilitate performance of operations, the operations comprising:
   obtaining video-related capability data representative of a video-related capability of a video consumer device that is to consume, via at least one downlink resource, video content to be streamed, via at least one uplink resource, by a video producer device that is recording, via at least one sensor, the video content;
   determining, based on the video-related capability data, an uplink data rate applicable to streaming the video content, via the at least one uplink resource, from the video producer device; and
   controlling uplink resource data relating to usage of the at least one uplink resource to limit the streaming, via the at least one uplink resource, the video content by the video producer device to the uplink data rate for download, via the at least one downlink resource, by the video consumer device.

2. The network device of claim 1, wherein the operations further comprise determining that the video consumer device and the video producer device are co-located on a common private network.

3. The network device of claim 1, wherein the controlling of the uplink resource data to limit the uplink data rate comprises at least one of: setting uplink physical resource block quota data representative of an uplink physical resource block quota applicable to the streaming of the video content, or setting bitrate data representative of a lower limit on a bitrate used for the streaming of the video content.

4. The network device of claim 1, wherein the controlling of the uplink resource data to limit the uplink data rate comprises at least one of: setting uplink multiple-input multiple-output layer data representative of an uplink multiple-input multiple-output layer to use for the streaming of the video content, setting uplink component carrier data representative of an uplink component carrier to use for the streaming of the video content; setting discontinuous reception on duration data representative of a discontinuous reception on duration applicable to the streaming of the video content, setting transmission time interval data for scheduling applicable to the streaming of the video content, or setting modulation and coding scheme data representative of a modulation and coding scheme to use for the streaming of the video content.

5. The network device of claim 1, wherein the operations further comprise determining that the video consumer device is a reduced capability device based on defined threshold data comprising at least one of: supported bandwidth data representative of a supported bandwidth of the video consumer device, modulation and coding scheme data representative of a modulation and coding scheme used by the video consumer device, or multiple-input multiple-output layer data representative of a multiple-input multiple-output layer used for communication by the video consumer device.

6. The network device of claim 1, wherein the obtaining of the video-related capability data comprises obtaining at least one of: hardware capability data representative of a hardware capability of the video consumer device, or channel condition data representative of a channel condition of a channel via which the video consumer device communicates.

7. The network device of claim 1, wherein the obtaining of the video-related capability data comprises obtaining measured packet reordering data representative of measured packet reordering applied by the video consumer device, and wherein the operations further comprise, based on quality of service index data representative of a quality of service index, that the video producer device and the video consumer device are associated with a common flow, determining that the measured packet reordering data does not satisfy defined reordering threshold data representative of a defined reordering threshold, and in response to the determining that a measured packet reordering count does not satisfy the defined reordering threshold data, detecting, via machine learning, that the video producer device is co-located on a common private network with the video consumer device.

8. The network device of claim 7, wherein the machine learning modifies the uplink data rate, and wherein the machine learning is based on at least one of: a correlation of burst identification traffic, or supervised learning.

9. The network device of claim 1, wherein the operations further comprise adapting the uplink data rate based on reinforcement learning.

10. The network device of claim 1, wherein the network device comprises a controller incorporated at least in part into a near-real time radio access intelligent controller.

11. A method, comprising:
    obtaining, by network equipment comprising a processor, capability data representative of a capability level of a downlink streaming device;
    obtaining, by the network equipment, performance data representative of a performance of the downlink streaming device according to a performance metric based on data communications with the downlink streaming device;
    determining, by the network equipment based on the capability data and the performance data, that the downlink streaming device is a reduced capability downlink streaming device co-located on a private network with an uplink streaming device that is recording, via at least one sensor, streaming content;
    determining, by the network equipment via the performance data, that the downlink streaming device is downloading, via at least one downlink channel, the streaming content being streamed, via at least one uplink channel, from the uplink streaming device beyond the capability level of the downlink streaming device to render output corresponding to the streaming content;

determining, by the network equipment, an applicable data rate at which the downlink streaming device is able to render the output corresponding to the streaming content; and acting, by the network equipment based on the applicable data rate, to limit a grant of uplink resources of the at least one uplink channel to the uplink streaming device to reduce an uplink data rate of the uplink streaming device to the applicable data rate.

12. The method of claim 11, further comprising identifying, by the network equipment based on at least one of a result of a machine learning process or an artificial intelligence process, that the downlink streaming device is co-located on the private network with the uplink streaming device.

13. The method of claim 11, further comprising identifying, by the network equipment, that the downlink streaming device is co-located on the private network with the uplink streaming device based on time-correlation between uplink traffic generated by the uplink streaming device and downlink traffic of at least one streaming bearer within the private network.

14. The method of claim 11, further comprising:
obtaining, by the network equipment, first operator-defined policy data, representative of a first policy defined by a network operator and corresponding to device capability threshold data,
obtaining, by the network equipment, second operator-defined policy data, representative of a second policy defined by the network operator and corresponding to quality threshold data, wherein the determining that the downlink streaming device is the reduced capability downlink streaming device comprises evaluating the capability data of the downlink streaming device with respect to the first operator-defined policy data, and wherein the determining that the reduced capability downlink streaming device is downloading the streaming data from the uplink streaming device beyond the capability level of the downlink streaming device comprises evaluating the performance data with respect to the second operator-defined policy data.

15. The method of claim 11, further comprising determining, by the network equipment, a quota corresponding to the applicable data rate, and wherein the acting to limit the grant of uplink resources comprises communicating quota data representative of the quota to a network node that grants the uplink resources to the uplink streaming device.

16. The method of claim 15, further comprising modifying, by the network equipment, the quota information based on at least one of: a result of a machine learning process or an artificial intelligence process.

17. A non-transitory machine-readable medium, comprising executable instructions that, when executed by a processor of network equipment, facilitate performance of operations, the operations comprising:
obtaining capability data of a content consumer device based on message data from the content consumer device;
determining, based on the capability data, that the content consumer device does not satisfy threshold capability data;
determining, based on quality data, that the content consumer device does not satisfy threshold quality data; and
reducing an uplink data rate of an uplink channel employed by a content producer device for streaming content recorded by at least one sensor of the content producer device to the network equipment for consumption by the content consumer device via a downlink channel from the network equipment.

18. The non-transitory machine-readable medium of claim 17, wherein the reducing of the uplink data rate comprises at least one of: setting quota data via a radio access network to which the content producer device is coupled, or setting a maximum uplink bitrate via a core network to which the content producer device is coupled.

19. The non-transitory machine-readable medium of claim 17, wherein the operations further comprise adapting the uplink data rate based on measured data comprising at least one of: uplink reordering data, downlink reordering data, uplink throughput data, downlink throughput data, uplink utilization data, or downlink utilization data.

20. The non-transitory machine-readable medium of claim 19, wherein the adapting of the uplink data rate comprises inputting the measured data into a machine learning model.

* * * * *